(12) United States Patent
McCarley et al.

(10) Patent No.: US 11,636,454 B2
(45) Date of Patent: Apr. 25, 2023

(54) METHODS AND SYSTEMS FOR ROUTING TRANSACTIONS BETWEEN AUTOMATED TELLER MACHINES, POINTS OF SALE, FINANCIAL INSTITUTIONS, AND SOFTWARE WALLETS

(71) Applicant: Cardtronics USA Inc., Houston, TX (US)

(72) Inventors: Jerry McCarley, Houston, TX (US); Mohammad Fraz Ahmed, Houston, TX (US); Michael Winbun, Houston, TX (US); Tammy Marks, Houston, TX (US); Brad Nolan, Houston, TX (US); Paul Gardiner, Houston, TX (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/844,477

(22) Filed: Apr. 9, 2020

(65) Prior Publication Data

US 2020/0327515 A1 Oct. 15, 2020

Related U.S. Application Data

(60) Provisional application No. 62/832,642, filed on Apr. 11, 2019.

(51) Int. Cl.
*G06Q 20/10* (2012.01)
*G06Q 40/02* (2012.01)
(Continued)

(52) U.S. Cl.
CPC .......... *G06Q 20/1085* (2013.01); *G06F 9/54* (2013.01); *G06Q 20/3223* (2013.01);
(Continued)

(58) Field of Classification Search
CPC .......... G06Q 20/1085; G06Q 20/3223; G06Q 20/3278; G06Q 20/36; G06Q 20/40145;
(Continued)

(56) References Cited

U.S. PATENT DOCUMENTS

| 8,660,943 B1 * | 2/2014 | Chirehdast ............. G06Q 40/00 705/38 |
| 10,013,684 B2 * | 7/2018 | Keys .................. G06Q 20/3821 |

(Continued)

FOREIGN PATENT DOCUMENTS

| CN | 1811830 A | * | 8/2006 |
| CN | 106855977 A | * | 6/2017 |

(Continued)

*Primary Examiner* — Kenneth Bartley
(74) *Attorney, Agent, or Firm* — Notaro, Michalos & Zaccaria P.C.; John S. Economou

(57) ABSTRACT

Systems and methods are provided for routing transactions from ATMs. In one embodiment, a method is provided that includes receiving a unique identifier that corresponds to a transaction requested by a user. In certain implementations, the unique identifier may be presented to the user by a third party separate from a provider of the ATM. The method may further include routing the unique identifier to an application programming interface affiliated with a provider of the ATM to confirm the transaction's validity. In certain implementations, the method may further comprise implementing the transaction and updating a settlement account to reflect the transaction.

20 Claims, 5 Drawing Sheets

(51) Int. Cl.
  *G06Q 20/42* (2012.01)
  *G06Q 20/32* (2012.01)
  *G06Q 20/40* (2012.01)
  *G06F 9/54* (2006.01)
  *G06Q 20/36* (2012.01)

(52) U.S. Cl.
  CPC ......... *G06Q 20/3278* (2013.01); *G06Q 20/36* (2013.01); *G06Q 20/40145* (2013.01); *G06Q 20/42* (2013.01); *G06Q 40/02* (2013.01)

(58) Field of Classification Search
  CPC ........ G06Q 20/42; G06Q 40/02; G06Q 20/10; G06Q 20/32; G06Q 20/40; G06F 9/54
  See application file for complete search history.

(56) References Cited

U.S. PATENT DOCUMENTS

| | | | |
|---|---|---|---|
| 10,535,047 B1* | 1/2020 | Thomas | G06Q 20/4012 |
| 10,963,850 B2* | 3/2021 | Aldridge | G06Q 20/425 |
| 10,984,419 B2* | 4/2021 | Ruparelia | G06Q 20/3278 |
| 11,055,972 B2* | 7/2021 | Licht | G07F 19/211 |
| 11,315,092 B1* | 4/2022 | Dennis | G06Q 20/425 |
| 2002/0188575 A1* | 12/2002 | Freeny, Jr. | G06Q 20/20 705/72 |
| 2004/0124966 A1* | 7/2004 | Forrest | G06Q 20/327 340/5.41 |
| 2007/0250920 A1* | 10/2007 | Lindsay | G07F 7/1025 726/7 |
| 2011/0238573 A1* | 9/2011 | Varadarajan | G07F 19/20 705/43 |
| 2012/0196586 A1* | 8/2012 | Grigg | H04B 5/0031 455/418 |
| 2012/0197796 A1* | 8/2012 | Dent | G06Q 20/1085 705/43 |
| 2012/0226610 A1* | 9/2012 | Gill | G06Q 20/322 705/43 |
| 2013/0054468 A1* | 2/2013 | Fuentes | G06Q 40/02 705/64 |
| 2013/0226799 A1* | 8/2013 | Raj | G07F 19/00 705/44 |
| 2013/0346309 A1* | 12/2013 | Giori | G06Q 20/10 705/43 |
| 2015/0074774 A1* | 3/2015 | Nema | H04L 63/08 726/5 |
| 2015/0199671 A1* | 7/2015 | Bajaj | G06Q 20/02 705/39 |
| 2015/0248674 A1* | 9/2015 | Han | G06Q 20/4014 705/43 |
| 2016/0063481 A1* | 3/2016 | Gupta | G06Q 20/3223 705/72 |
| 2016/0086261 A1* | 3/2016 | Shah | G06Q 10/105 705/38 |
| 2016/0358139 A1* | 12/2016 | Keys | G06Q 20/385 |
| 2017/0039536 A1* | 2/2017 | Pandey | G06Q 20/204 |
| 2017/0124544 A1* | 5/2017 | Recriwal | G06Q 20/1085 |
| 2017/0132593 A1* | 5/2017 | Block | G06Q 20/40145 |
| 2017/0236101 A1* | 8/2017 | Irudayam | G06Q 20/3223 382/140 |
| 2017/0243184 A1* | 8/2017 | Bondesen | G06Q 20/405 |
| 2017/0262823 A1* | 9/2017 | Hartung | G07F 19/203 |
| 2017/0286958 A1* | 10/2017 | Herman | G06Q 20/3821 |
| 2018/0068297 A1* | 3/2018 | Goodman | G06Q 20/32 |
| 2018/0121926 A1* | 5/2018 | Sharma | G06Q 20/3274 |
| 2018/0137483 A1* | 5/2018 | McCann | G06Q 20/385 |
| 2018/0350007 A1* | 12/2018 | Chen | G06Q 40/123 |
| 2019/0005474 A1* | 1/2019 | Cady | G06Q 40/02 |
| 2020/0005261 A1* | 1/2020 | Arora | G06Q 20/40145 |
| 2020/0005262 A1* | 1/2020 | Arora | G06Q 20/3224 |
| 2020/0005263 A1* | 1/2020 | Arora | G07F 19/207 |
| 2020/0273022 A1* | 8/2020 | McFarren | G06Q 20/02 |
| 2020/0327515 A1* | 10/2020 | McCarley | G06Q 40/02 |
| 2021/0042727 A1* | 2/2021 | Fernandez Freire | G07F 19/203 |
| 2021/0209582 A1* | 7/2021 | Paliwal | G06F 21/31 |
| 2022/0180365 A1* | 6/2022 | McCarley | G06Q 20/326 |

FOREIGN PATENT DOCUMENTS

| | | | | |
|---|---|---|---|---|
| EP | 1971108 A2 | * | 9/2008 | ............ G06Q 20/04 |
| KR | 20070042712 A | * | 4/2007 | |
| KR | 20110078899 A | * | 7/2011 | |

* cited by examiner

METHODS AND SYSTEMS FOR ROUTING TRANSACTIONS BETWEEN AUTOMATED TELLER MACHINES, POINTS OF SALE, FINANCIAL INSTITUTIONS, AND SOFTWARE WALLETS

CROSS-REFERENCE TO RELATED APPLICATIONS

The present application claims priority to U.S. Provisional Patent Application No. 62/832,642, filed on Apr. 11, 2019, the disclosure of which is incorporated herein by reference for all purposes.

BACKGROUND

Software wallets (e.g., Venmo®, Paypal®, Amazon Pay®, Apple Pay®) provide services similar to banks using technology such as applications that run on users' smartphones or other computing devices. Traditional financial institutions (e.g., banks) also provide applications that enable users to handle certain banking operations from their computing devices. Both types of applications make it easier for users to handle certain types of transactions, but do not typically handle cash transactions such as deposits or withdrawals into software wallets or accounts with traditional financial institutions.

SUMMARY

The present disclosure presents new and innovative systems and methods for routing transactions between ATMs, financial institutions, and software wallets. In one embodiment, a method is provided comprising receiving a unique identifier corresponding to a transaction requested by a user at an automated teller machine (ATM) and routing the unique identifier to an application programming interface (API) affiliated with the ATM to confirm a validity of the transaction. The method may further include implementing the transaction by one or more of (i) dispensing cash to the user and (ii) accepting a deposit from the user and updating a settlement account to reflect the transaction.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

In many cases, software wallets lack cash dispensing or depositing capabilities. Similarly, consumers banking with traditional financial institutions may prefer to interact with ATMs without having to carry their credit or debit cards. Such consumers may therefore require a way to interface between the applications of, e.g., their software wallets or traditional financial institutions and ATMs or points of sale (POSs) (e.g., a physical merchant terminal or a virtual storefront) in order to deposit or withdraw cash from their accounts. Additionally, it may be preferable for the platform enabling such activities to be financial institution-agnostic, so consumers using different software wallets or banking with different financial institutions are able to use the ATMs and/or POSs services. One method for providing these capabilities is to provide an application programming interface (API) that routes transactions from ATMs to corresponding financial institutions to verify and carry out the consumer's desired operations.

Figure 1:
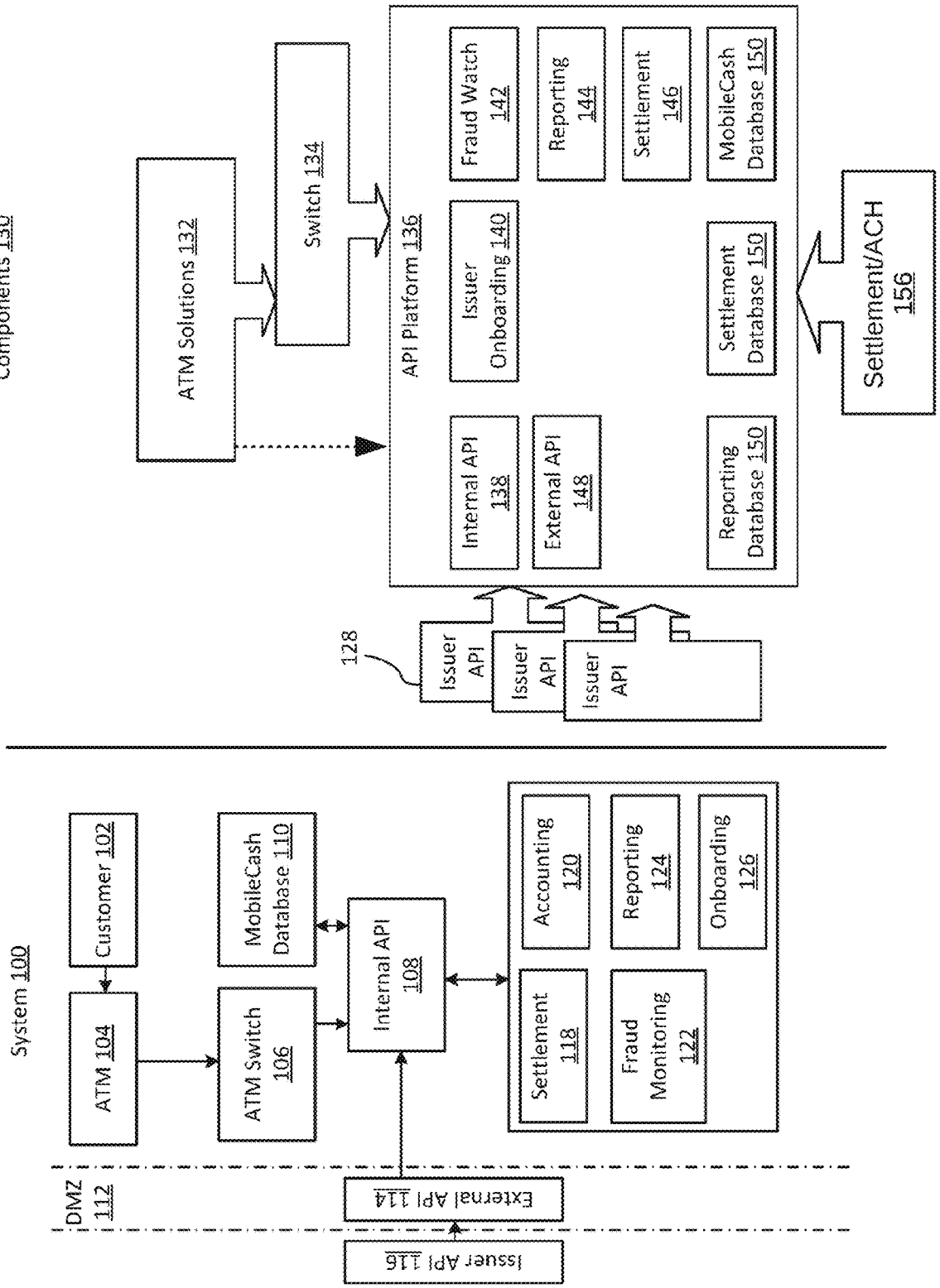
FIG. 1 illustrates a flow diagram and components according to an exemplary embodiment of the present disclosure.

FIG. 1 depicts a system 100 and associated components 130 according to an exemplary embodiment of the present disclosure. The system 100 includes a customer 102 and an ATM 104 that interact with one another. Although an ATM 104 is depicted in FIG. 1, the system 100 may also be configured to operate with POSs. Accordingly, it should be understood that references to an ATM in the present application expressly incorporate and apply to POSs as well, as well as any other computing device associated with a merchant. The ATM 104 may present one or more screens requesting information required to confirm, authorize, and carry out the customer 102's desired operations (e.g., depositing or withdrawing cash). The ATM 104 connects to an ATM switch 106, which may be responsible for carrying out networking and transaction routing operations on behalf of the ATM 104. The ATM switch 106 connects to an internal API 108. The internal API 108 may be provided by the same institution or company that provides the ATM 104 to properly analyze, route, and confirm transactions received from the customer 102 via the ATM 104. For example, the internal API 108 may interact with a mobile cash database 110 and internal systems such as settlement systems 118, accounting systems 120, fraud monitoring systems 122, reporting systems 124, and onboarding systems 126. The internal API 108 is also connected to an external API 114, which may be responsible for interfacing with an issuer API 116 to validate transaction information received at the ATM, as explained in greater detail below. Both the external API 114 and the internal API 108 may be implemented by the same institution responsible for the ATM 104, while the issuer API 116 may be implemented by another party, such as a software wallet provider or other financial institution.

The components 130 depict exemplary components that may be responsible for implementing the system 100. The components 130 include ATM solutions 132, such as the ATM 104 and a switch 134, such as the ATM switch 106. The ATM solutions 132 connects to a API platform 136 via the switch 134, or may optionally connect directly to the API platform 136 in certain implementations. The API platform 136 includes an internal API 138 and an external API 148, which may respectively implement the internal API 108 and the external API 114. The API platform 136 also includes an issuer onboarding module 140, which may include documentation and other information necessary for issuer institutions to interact with the API platform 136. For example, the issuer onboarding module 140 may include information on how to configure an issuer API 116, 128 to properly interface with, e.g., the external API 148. The API platform 136 also includes a fraud watch module 142, a reporting module 144, and a settlement module 146 respectively responsible for monitoring transactions through the API platform 136 for potentially fraudulent activity, logging and reporting transactions (e.g., per regulatory requirements or business requirements), and settling accounts for individuals and issuers (e.g., via the settlement and automated clearing house (ACH) system 156). The reporting module 144 may store reporting information in the reporting database 150. The settlement module 146 may store settlement information in the settlement database 152, and the internal API 138 may store transaction or other information in the mobile cash database 154.

In certain implementations, the system 100 may also be configured to incorporate with additional external APIs, such as the APIs of other cardless ATM or POS financial services (e.g., FIS®, Rapyd®). Further external APIs may facilitate compliance with "know your customer" and anti-money laundering requirements. Still further external API connections may enable additional features, such as money transfers, prepaid cards, and lending services. In certain implementations, the system 100 may also coordinate with additional external APIs to report transaction information to data aggregators, credit reporting agencies, customers, and other designated parties.

Figure 2:
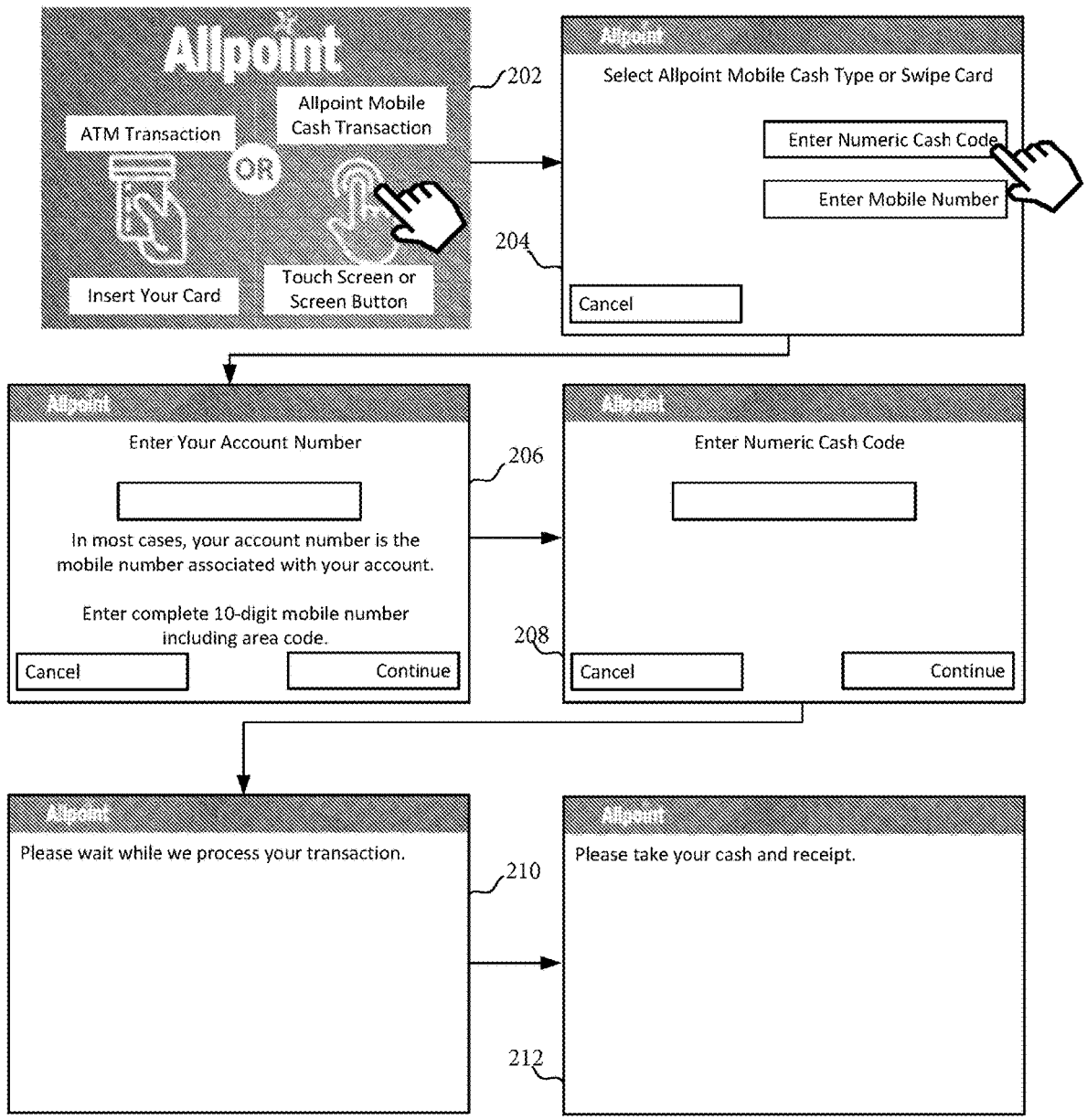
FIG. 2 illustrates a screen flow according to an exemplary embodiment of the present disclosure.

FIG. 2 depicts a screen flow according to an exemplary embodiment of the present disclosure. The screen flow may be presented by an ATM 104 to a customer 102 to enable the customer 102 to process a transaction using a unique identifier (e.g., a unique numeric identifier, a unique digital code, a unique transmission) provided by an application (e.g., a financial institution or software wallet application on a smartphone). In certain implementations, the unique identifier may be used to interact with a software wallet provider's API to enable the customer 102 to deposit or withdraw cash.

In the first screen 202, the customer 102 is presented with a selection between a traditional ATM transaction and a mobile cash transaction. If the customer selects a mobile cash transaction, the customer 102 is given the option to select between using a unique identifier to implement the transaction and using a QR code or a mobile number (discussed herein) on screen 204. If the user selects a unique identifier, the ATM 104 may present screen 206, requesting the customer 102 to enter an account number for the account from which they plan to withdraw or deposit cash. After the account number is entered, the ATM 104 may present screen 208 requesting a numeric cash code or unique identifier to validate the customer 102's requested transaction. The unique identifier may be presented within a mobile application of the customer 102's software wallet or financial institution. For example, the unique identifier may be received from the mobile application executing on the customer 102's mobile device after verifying one or more biometric scans of the customer (e.g., one or more scans of the customer's face, fingerprints, voice, and/or other biometric indicator). Additionally or alternatively, the unique identifier may be sent to a mobile number associated with the customer (e.g., a mobile number associated with the account number entered in screen 206) via text message or other messaging protocol. The unique identifier may be a single-use code (e.g., a code generated to only be valid for a single use and/or a predetermined period of time). Additionally or alternatively, the unique identifier may be used for multiple transactions (e.g., multiple transactions over a predetermined period of time). Furthermore, rather than entering the numeric cash code or unique identifier via the ATM 104, the customer 102's mobile device may be used to enter the numeric cash code or unique identifier. For example, the customer 102 may enter the numeric cash code or unique identifier via a mobile application associated with the customer 102's software wallet or financial institution. In further instances, rather than manually entering a code via the ATM 104 or the customer 102's mobile device, short-range wireless communication techniques may be used to transmit the unique identifier from the ATM 104 to the mobile device (or vice-versa). For example, near-field communication (NFC), Bluetooth, or other wireless communication protocols may be used to transmit the unique identifier from the ATM to the mobile device, which may then provide the unique identifier to a mobile application of the customer 102's software wallet or financial institution. After the unique identifier is entered, the ATM 104 and/or the mobile application may then validate the unique identifier (screen 210), allowing the ATM 104 to dispense or deposit the cash (screen 212). In certain implementations, an additional screen may appear between screens 210 and 212 to verify the amount of cash to be deposited or withdrawn.

Figure 3:
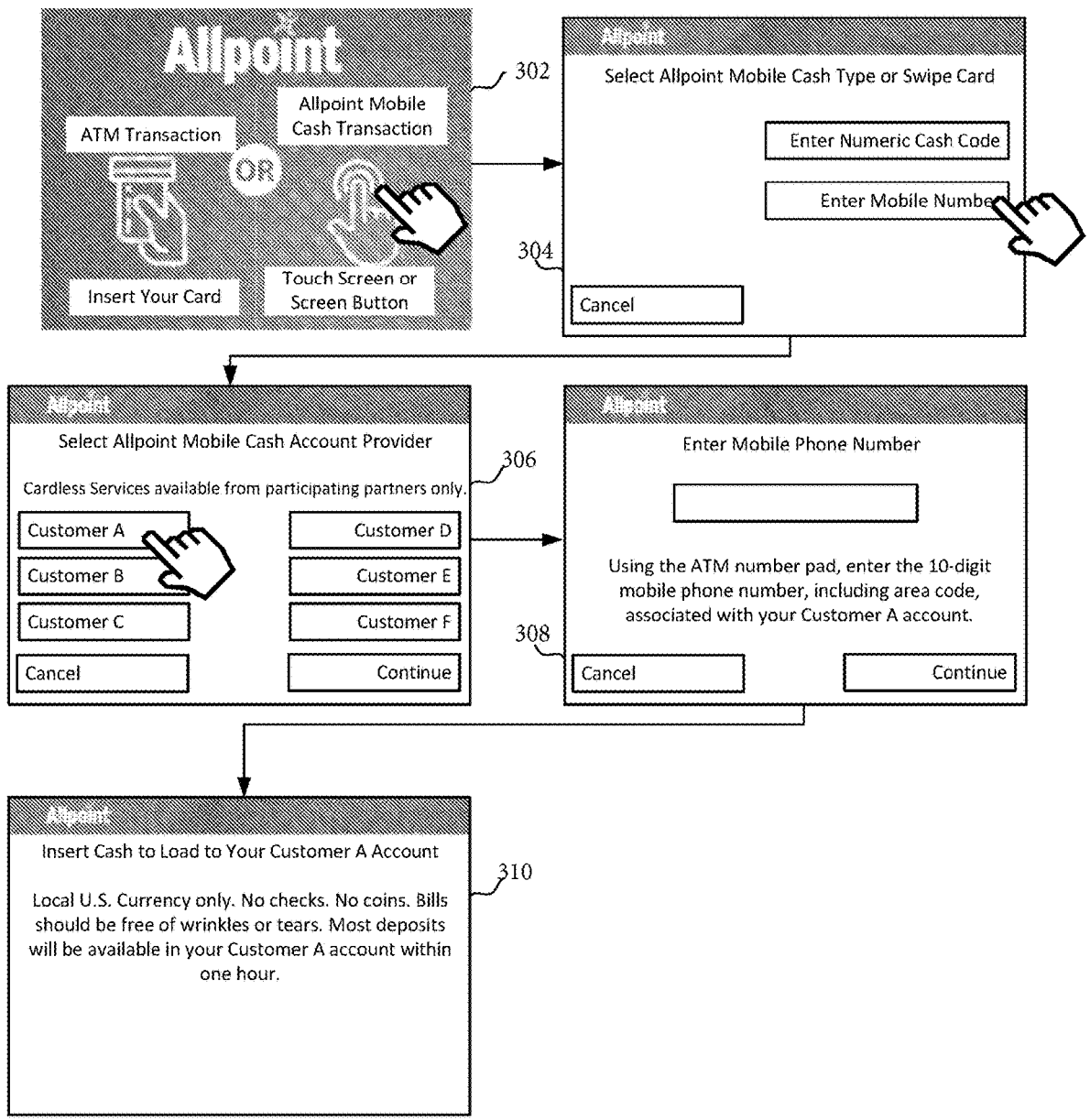
FIG. 3 illustrates a screen flow according to an exemplary embodiment of the present disclosure.

FIG. 3 depicts a screen flow according to an exemplary embodiment of the present disclosure. The screen flow may be presented by an ATM 104 to a customer 102 to enable the customer 102 to process a transaction using their mobile phone number. In certain implementations, the customer 102's phone number may be used to enable the customer 102 to deposit cash, but may restrict the customer 102 from withdrawing cash for security reasons.

In the first screen 302, the customer 102 is presented with a selection between a traditional ATM transaction and a mobile cash transaction. If the customer selects a mobile cash transaction, the customer 102 is given the option to select a mobile number or an account number to initiate the transaction on screen 304. The customer 102 may then be prompted in screen 306 to select an account provider (e.g., an issuer institution). After selecting the account provider, the customer 102 is prompted to input their mobile phone or account number associated with their account with the account provider in screen 308. In additional or alternative implementations, the customer 102 may be prompted to input different information, such as a unique identifier generated and received using techniques similar to those discussed above in connection with screen 208. The ATM 104 and/or a mobile application associated with the customer 102's software wallet or financial institution may then validate the transaction (screen 310) and enact the deposit according to the customer 102's request.

Figure 4:
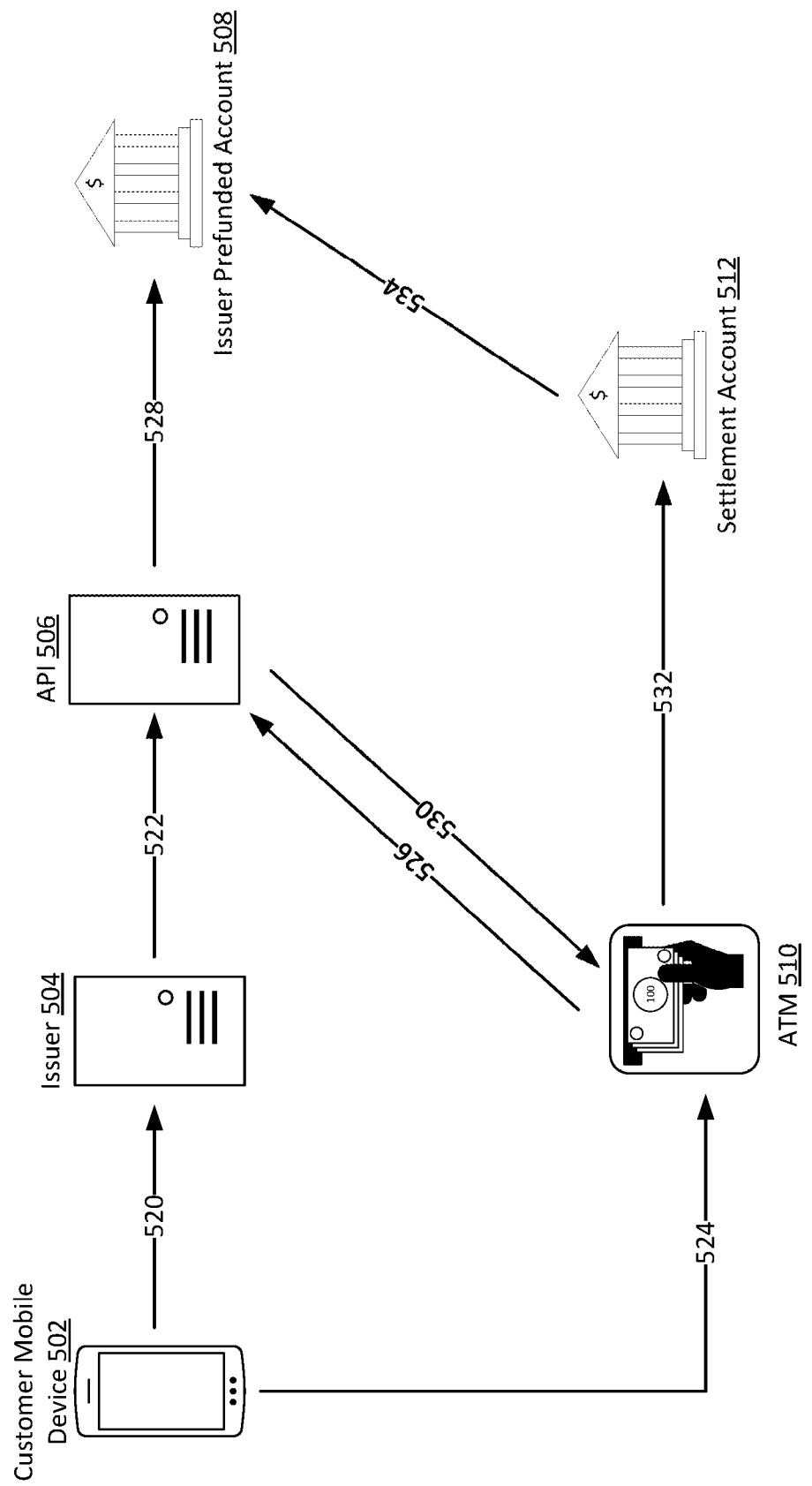
FIG. 4 illustrates a method according to an exemplary embodiment of the present disclosure.

FIG. 4 depicts a method for performing a staged transaction according to an exemplary embodiment of the present disclosure. In a staged transaction, the issuer may transfer money to a settlement account provided by the ATM provider when a customer requests a transaction via a corresponding application. In certain implementations, funds for staged transactions may be transferred from the issuer to the settlement at the end of the day. In such implementations, the funds may not transfer at the end of the day unless the customer 102 withdrew the funds from the ATM. Such staging may enable the customer 102 to withdraw cash from an account provided by a software wallet provider and/or a financial institution.

In other embodiments, the account provider (e.g., financial institution or software wallet provider) may stage a transaction on behalf of a customer. For example, if the customer works for an internet services company such as Uber®, Instacart®, DoorDash®, or Amazon®, the internet services company may transfer all or part of the wages earned by the customer 102 to a software wallet provided by the API provider associated with the customer 102. In certain implementations, some or all of the payment may be staged on behalf of the customer 102 for subsequent withdrawal from a POS or ATM. In addition, if the customer 102 works for multiple internet services companies, multiple companies may stage a transaction on behalf of the customer 102 and the customer 102 may then be able to withdraw the total amount staged by the multiple companies at the same time from a POS or ATM.

At step 520, the customer 102 requests to retrieve cash via the consumer mobile device 502 (e.g., a smartphone application). This request may be transmitted to the issuer or mobile cash provider 504 (e.g., the software wallet provider or the financial institution) via the consumer mobile device 502.

At step 522, the issuer may approve the withdrawal request after validating the customer 102's information and may send the customer 102's phone number, authorization code and withdrawal amount to the API 506 (e.g., an API provided by the ATM 510 provider). The authorization code may be created by the issuer 504 or by the API 506.

At step 528, the API 506 may verify the balance in a prefunded account 508 affiliated with the issuer 504. If sufficient funds are available in the prefunded account 508, the API 506 may then stage the transaction. In certain implementations, the API 506 may reduce the balance in the prefunded account 508 via a memo hold for each transaction staged. If sufficient funds are not available, the API 506 may not authorize or stage the requested transaction. At step 524, the customer 102 goes to the ATM 510 to perform the withdrawal. At the ATM 510, the customer 102 may enter their phone number, account number, and authorization code (e.g., unique identifier) into the ATM 510, similar to the screen flow depicted in FIG. 2. In certain implementations, the amount for the transaction may not need to be entered at the ATM 510 because the transaction has already been staged in the settlement account 512. Other methods of verifying the customer 102's identity are also possible (e.g., methods similar to those depicted in FIG. 3). In further implementations, the customer 102's identity may be verified by a third party regulatory services provider. For example, the regulatory services provider may provide an API that assists companies in complying with "know your customer," anti-money laundering, and customer identification regulatory requirements. In such instances, the API 506 may invoke the regulatory services provider's API to verify the customer 102's identity.

At step 526, the ATM 510 may connect to the API 506 to authorize the information provided by the customer 102. The API 506 may verify if the information provided is correct and if the corresponding transaction was staged. If the transaction was successfully staged, the API 506 may approve the transaction (step 530) and the ATM may dispense the cash (step 532). If the transaction was not staged, the transaction may be declined.

At step 534, after the ATM 510 has dispensed the cash, the settlement account 512 may reconcile with the prefunded account 508. For example, the settlement account 512 or the ATM 510 provider may send an ACH debit daily to the prefunded account 508 for all approved transactions redeemed at ATMs 510 provided by the ATM 510 provider. In other implementations, the settlement account 512 may reconcile with the issuer directly. For example, the API 506 may instead reconcile the transaction directly with the issuer (e.g., via a daily ACH).

Figure 5:
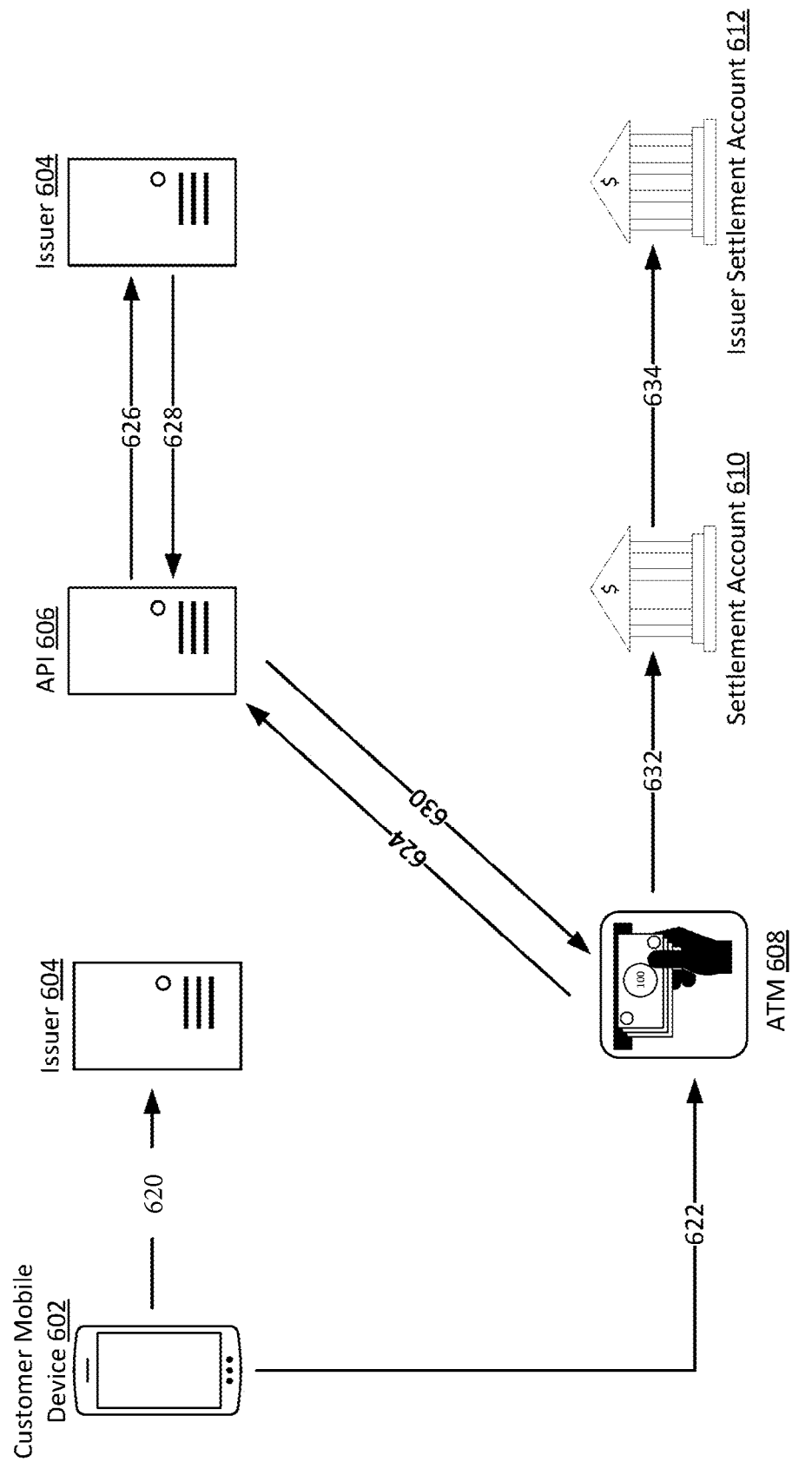
FIG. 5 illustrates a method according to an exemplary embodiment of the present disclosure.

FIG. 5 depicts a method for performing a direct transaction according to an exemplary embodiment of the present disclosure. In a direct transaction, the issuer may directly participate in the validation of a transaction request and may transfer the corresponding funds at least once each day (e.g., via a daily ACH) inclusive of the preceding transactions. Direct transactions may enable the customer 102 to deposit and withdraw cash from an account provided by a software wallet provider and/or a financial institution.

At step 620, the customer 102 requests to withdraw or deposit cash via the consumer mobile device 602 (e.g., a smartphone application). This request may be transmitted to the issuer or mobile cash provider 604 (e.g., the software wallet provider or the financial institution) via the consumer mobile device 602. The issuer may then validate the customer 102's identity and may present an authorization code (e.g., a unique identifier). The authorization code may be generated using the API 606 or may be generated by the issuer 604 according to a different API (e.g., an issuer API 116) that meets the requirements of the API 606. The issuer 604 may then provide the authorization code to the user via the consumer mobile device 602 (e.g., via a smartphone application or via SMS or another messaging service).

At step 622, the customer 102 goes to the ATM 608 to perform the transaction. At the ATM 608, the customer 102 may enter their phone number, account number, and authorization code (e.g., unique identifier) into the ATM 608, similar to the screen flow depicted in FIG. 3. Other methods of verifying the customer 102's identity are also possible (e.g., methods similar to those depicted in FIG. 3). Unlike the staged transaction of FIG. 4, the customer 102 may have to enter the transaction amount for a direct transaction, as the transaction is not staged.

At step 624, the ATM 608 connects to the API 606 to authorize the information provided by the customer 102. The API 606 may send an authorization request to the issuer 604 (e.g., an issuer API 116 of the issuer 604) to verify the information provided by the customer 102 (step 626).

At step 628, issuer 604 validates the information provided by the customer 102, including the authorization code. The issuer 604 may generate an authorization response indicating the validation result and may transmit the authorization response to the API 606. For example, if the information provided by the customer 102 is valid, the issuer 604 may approve the transaction (e.g., the deposit or withdrawal) and may include that approval in the authorization response. If the information is not valid, the issuer 604 may reject the transaction and may include that rejection in the authorization response.

At step 630, the issuer 604's authorization response may be sent to the ATM 608 from the API 606. If the authorization response includes an approval, the ATM 608 may dispense the cash for a withdrawal or process the deposit (step 632). If the authorization response includes a denial, the ATM 608 may deny the transaction.

At step 634, the settlement account 610 may reconcile with an issuer settlement account 612 affiliated with the issuer 604. For example, the settlement account 612 or the ATM 608 provider may send an ACH debit daily to the issuer settlement account 612 for all approved transactions redeemed at ATMs 608 provided by the ATM 608 provider.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices.

The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving a transaction request at an issuer application programming interface (API) of an account issuer via a mobile device of a user, the issuer API running on a first processor;
validating and authorizing the transaction request at the issuer API;
forwarding information about the transaction from the issuer API to an internal API associated with an automated teller machine (ATM), the internal API running on a second processor;
generating a unique identifier for the transaction request at the issuer API or at the internal API;
providing the unique identifier to the mobile device of the user;
receiving the unique identifier from the user at the ATM without presenting any card and without connecting the mobile device of the user to the ATM;
providing the unique identifier from the ATM to the internal API to confirm a validity of the transaction;
implementing the transaction at the ATM by one or more of (i) dispensing cash to the user and (ii) accepting a deposit from the user; and
updating a settlement account to reflect the transaction.

2. The method of claim 1, wherein the transaction is a staged transaction.

3. The method of claim 2, wherein the validity of the staged transaction is confirmed based on one or more of a phone number, the unique identifier, an account number, and a withdrawal amount received by the internal API.

4. The method of claim 3, wherein the one or more of the phone number, the unique identifier, the account number, and the withdrawal amount is received by the internal API from the issuer API affiliated with the account issuer.

5. The method of claim 4, wherein the issuer API is associated with an account of an internet services company and the staged transaction is to withdraw wages associated with the user.

6. The method of claim 1, wherein the transaction is a direct transaction.

7. The method of claim 6, wherein the validity of the direct transaction is confirmed based on a withdrawal amount and the unique identifier received by the ATM from the user.

8. The method of claim 7, wherein the validity of the direct transaction is confirmed by providing, via the internal API, the withdrawal amount and the unique identifier to the issuer API affiliated with an entity other than a provider of the ATM.

9. The method of claim 1, wherein the unique identifier is provided to the mobile device of the user only after verifying one or more biometric identifiers of the user.

10. The method of claim 1, wherein the unique identifier for the transaction request is generated at the issuer API.

11. The method of claim 1, wherein the unique identifier for the transaction request is generated at the internal API.

12. A system comprising:
a first processor and a first memory, the first memory storing instructions which, when executed by the first processor, cause the first processor to implement an issuer application programming interface (API) of an account issuer which:
receives a transaction request at via a mobile device of a user;
validates and authorizes the transaction request;
forwards information about the transaction to an internal API associated with an automated teller machine (ATM);
generates a unique identifier for the transaction request; and
provides the unique identifier to the mobile device of the user;
an ATM which receives the unique identifier from the user at the ATM without presenting any card and without connecting the mobile device of the user to the ATM, provides the unique identifier to the internal API, and, upon receiving confirmation of a validity of the transaction, implements the transaction by one or more of (i) dispensing cash to the user and (ii) accepting a deposit from the user; and
a second processor and a second memory, the second memory storing instructions which, when executed by the second processor, cause the second processor to implement the internal API of a provider of the ATM which:
receives the information about the transaction from the issuer API;
receives the unique identifier from the ATM;
selectively provides a confirmation of the validity of the transaction to the ATM based upon the information and the unique identifier; and
updates a settlement account to reflect the transaction.

13. The system of claim 12, wherein the transaction is a staged transaction.

14. The system of claim 13, wherein the validity of the staged transaction is confirmed based on one or more of a phone number, the unique identifier, an account number, and a withdrawal amount received by the internal API.

15. The system of claim 14, wherein the one or more of the phone number, the unique identifier, the account number, and the withdrawal amount is received by the internal API from an issuer API affiliated with an entity other than the provider of the ATM.

16. The system of claim 15, wherein the issuer API is associated with an account of an internet services company and the staged transaction is to withdraw wages associated with the user.

17. The system of claim 12, wherein the transaction is a direct transaction.

18. The system of claim 17, wherein the validity of the direct transaction is confirmed based on a withdrawal amount and the unique identifier received by the ATM from the user.

19. The system of claim 18, wherein the validity of the direct transaction is confirmed by providing, via the internal API, the withdrawal amount and the unique identifier to the issuer API affiliated with an entity other than the provider of the ATM.

20. A system comprising:
a first processor and a first memory, the first memory storing instructions which, when executed by the first processor, cause the first processor to implement an issuer application programming interface (API) of an account issuer which:
receives a transaction request at via a mobile device of a user;
validates and authorizes the transaction request; and
forwards information about the transaction to an internal API associated with an automated teller machine (ATM);
an ATM which receives a unique identifier from the user at the ATM without presenting any card and without connecting the mobile device of the user to the ATM, provides the unique identifier to the internal API, and, upon receiving confirmation of a validity of the transaction, implements the transaction by one or more of (i) dispensing cash to the user and (ii) accepting a deposit from the user; and
a second processor and a second memory, the second memory storing instructions which, when executed by the second processor, cause the second processor to implement the internal API of a provider of the ATM which:
receives the information about the transaction from the issuer API;
generates a unique identifier for the transaction request; and
provides the unique identifier to the mobile device of the user;
receives the unique identifier from the ATM;
selectively provides a confirmation of the validity of the transaction to the ATM; and
updates a settlement account to reflect the transaction.

* * * * *